US012734603B2

(12) United States Patent
Fujii et al.

(10) Patent No.: US 12,734,603 B2
(45) Date of Patent: Sep. 15, 2026

(54) DISSIMILAR MATERIAL SOLID PHASE BONDING METHOD, AND DISSIMILAR MATERIAL SOLID PHASE BONDED STRUCTURE

(71) Applicant: OSAKA UNIVERSITY, Suita (JP)

(72) Inventors: Hidetoshi Fujii, Suita (JP); Yoshiaki Morisada, Suita (JP); Yasuhiro Aoki, Suita (JP)

(73) Assignee: THE UNIVERSITY OF OSAKA, Suita (JP)

( * ) Notice: Subject to any disclaimer, the term of this patent is extended or adjusted under 35 U.S.C. 154(b) by 1262 days.

(21) Appl. No.: 17/632,714

(22) PCT Filed: Jul. 9, 2020

(86) PCT No.: PCT/JP2020/026796

§ 371 (c)(1),
(2) Date: Feb. 3, 2022

(87) PCT Pub. No.: WO2021/024687

PCT Pub. Date: Feb. 11, 2021

(65) Prior Publication Data

US 2025/0353103 A1 Nov. 20, 2025

(30) Foreign Application Priority Data

Aug. 7, 2019 (JP) ................................ 2019-144978

(51) Int. Cl.
*B23K 20/00* (2006.01)
*B23K 20/12* (2006.01)
(Continued)

(52) U.S. Cl.
CPC ........ *B23K 20/121* (2013.01); *B23K 20/1205* (2013.01); *B23K 20/22* (2013.01); *B23K 2103/02* (2018.08); *B23K 2103/18* (2018.08)

(58) Field of Classification Search
CPC .... B23K 20/12; B23K 2103/04; B23K 11/02; B23K 2103/20; B23K 2103/24;
(Continued)

(56) References Cited

U.S. PATENT DOCUMENTS 11,465,230 B2 * 10/2022 Nakaya .................... B23B 5/08
11,465,243 B2 * 10/2022 Mann .................. B23K 35/004
(Continued)

FOREIGN PATENT DOCUMENTS

JP 60-133987 A 7/1985
JP 5-131280 A 5/1993
(Continued)

OTHER PUBLICATIONS

Computer English translation of WO2018168687A1 (Year: 2018).*
(Continued)

*Primary Examiner* — Erin B Saad
(74) *Attorney, Agent, or Firm* — WHDA, LLP

(57) ABSTRACT

The present invention provides dissimilar material solid phase bonding with which a robust bonded portion of metal materials having different compositions can be formed efficiently. The present invention also provides a dissimilar material solid phase bonded structure having a dissimilar material solid phase bonded portion in which metal materials having different compositions have been bonded together robustly. In the dissimilar material solid phase bonding method according to the present invention, one member is brought into contact with another member to form an interface to be bonded, and newly formed surfaces of the one member and the other member are formed at the interface to be bonded, by means of the application of a bonding load, characterized in that: the one member and the other member have different compositions; the temperature at which the one member and the other member have
(Continued)

substantially the same strength is defined as a bonding temperature; and the bonding load at which strength is applied substantially perpendicular to the interface to be bonded is set.

7 Claims, 14 Drawing Sheets

(51) Int. Cl.
*B23K 20/22* (2006.01)
*B23K 103/02* (2006.01)
*B23K 103/18* (2006.01)

(58) Field of Classification Search
CPC ........................... B23K 20/023; B23K 20/028; B23K 20/1205; B23K 20/123
See application file for complete search history.

(56) References Cited

U.S. PATENT DOCUMENTS 11,505,339 B2* 11/2022 Meschini ............... B62D 33/06
11,745,287 B2* 9/2023 Fujii ...................... B23K 20/02 228/193
12,103,102 B2* 10/2024 Herrich .................. B23K 28/02
2008/0163622 A1* 7/2008 Schlegl ................... F01D 25/16 60/599
2009/0227902 A1* 9/2009 Simpson ............ B23K 15/0046 600/585
2010/0102106 A1* 4/2010 Bray .................... B23K 20/129 228/101
2011/0132971 A1* 6/2011 Kolbe .................. B23K 33/008 228/114
2012/0301307 A1* 11/2012 Yang .................... B23K 20/129 228/114.5
2013/0092662 A1* 4/2013 Fukami ................ B23K 1/0004 219/78.01
2013/0180728 A1* 7/2013 Hugghins ............... E21B 17/04 166/242.6
2016/0040276 A1* 2/2016 Ishida ....................... C22F 1/14 148/707
2016/0207140 A1* 7/2016 Dong ..................... B23K 20/24
2017/0246707 A1* 8/2017 Bray ......................... F01D 5/28
2018/0065205 A1* 3/2018 Geyer .................. B23K 13/025
2018/0147656 A1* 5/2018 Zhang .................. B23K 20/121
2020/0023458 A1* 1/2020 Fujii .................... B23K 20/121
2022/0371120 A1* 11/2022 Fujii ...................... B23K 20/16

FOREIGN PATENT DOCUMENTS

JP 2002-283070 A 10/2002
JP 2006-21217 A 1/2006
JP 2007-253172 A 10/2007
JP 2008-6451 A 1/2008
JP 2011-56534 A 3/2011
JP 2018-122344 A 8/2018
WO 2017/022184 A1 2/2017

OTHER PUBLICATIONS

Mukundhan et al. ("Microstructural Features, Tensile Properties, and Impact Toughness of Linear Friction Welded High-Temperature Alloy Joints for Blisk Assembly Applications", Advances in Materials Science and Engineering, Sep. 2022) (Year: 2022).*
International Search Report dated Sep. 8, 2020, issued in counterpart International Application No. PCT/JP2020/026796. (3 pages).

* cited by examiner

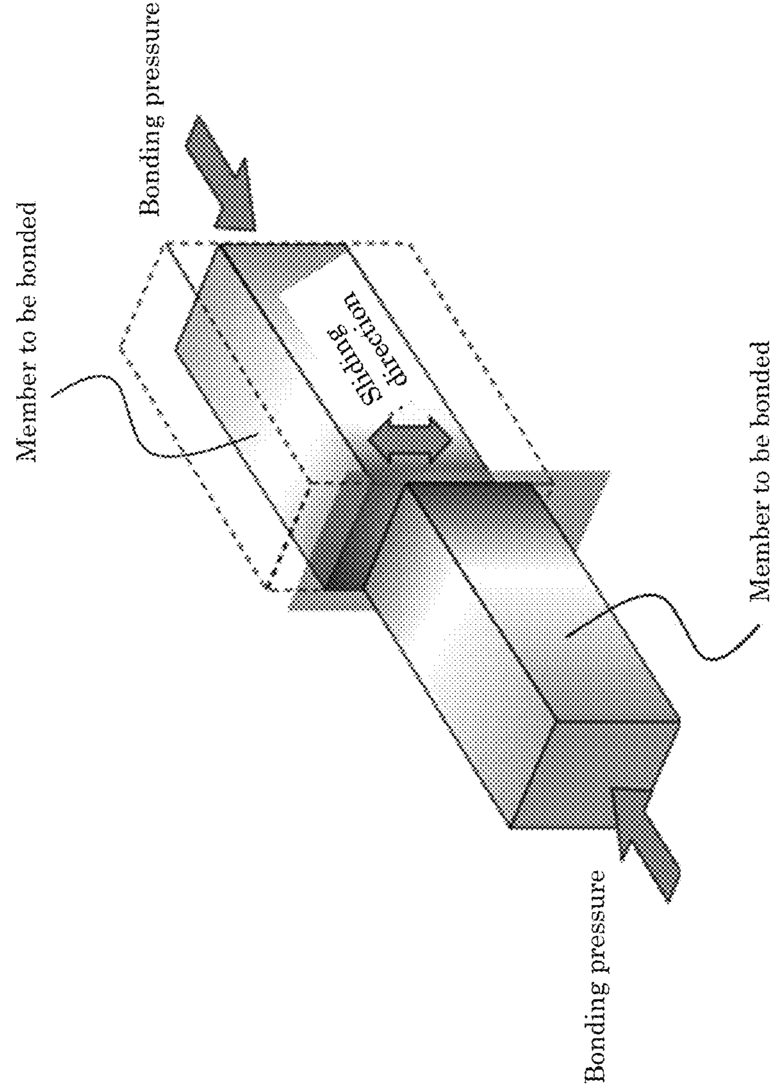
[FIG.1]

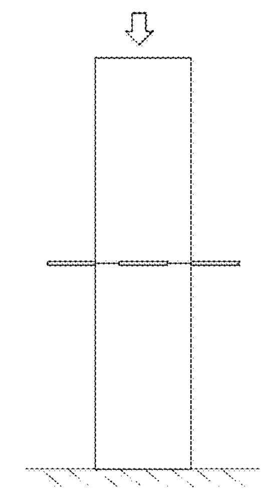
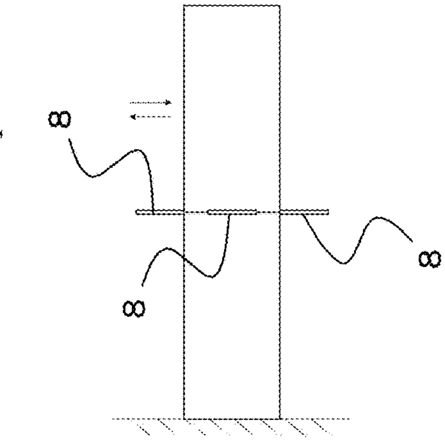
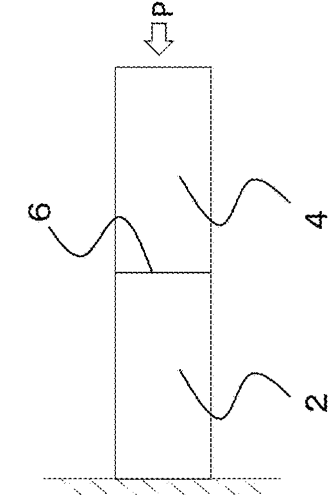
[FIG.2]

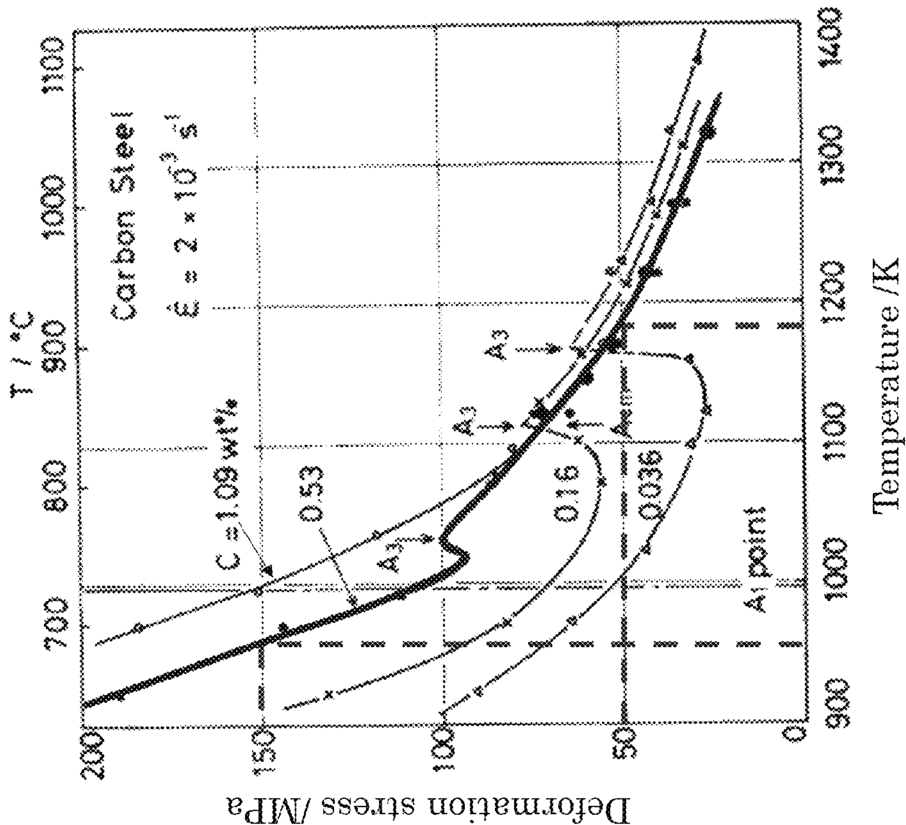
[FIG.3]

[FIG.4]
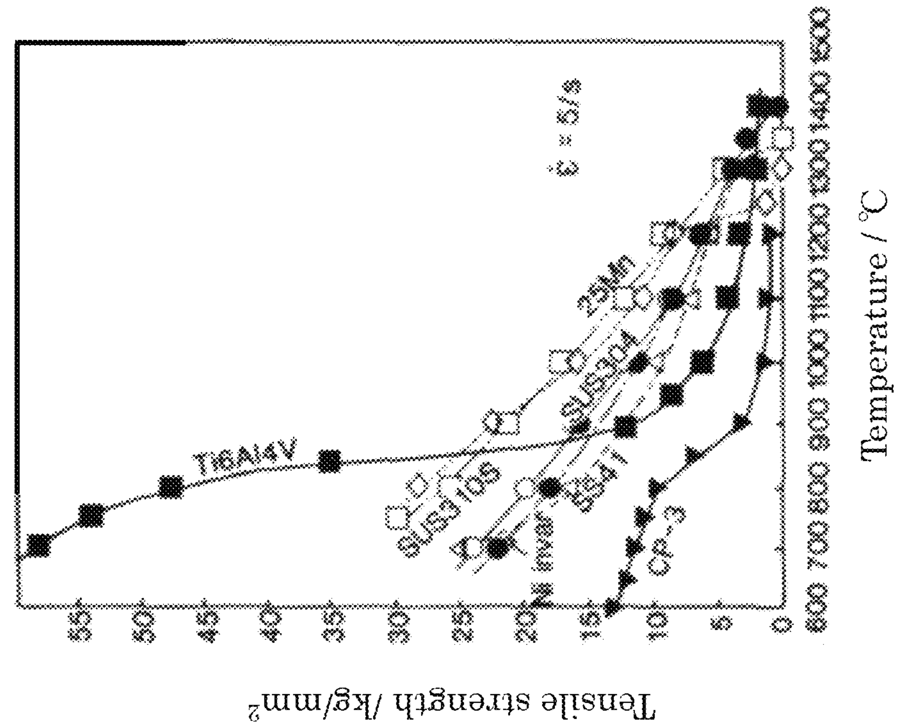

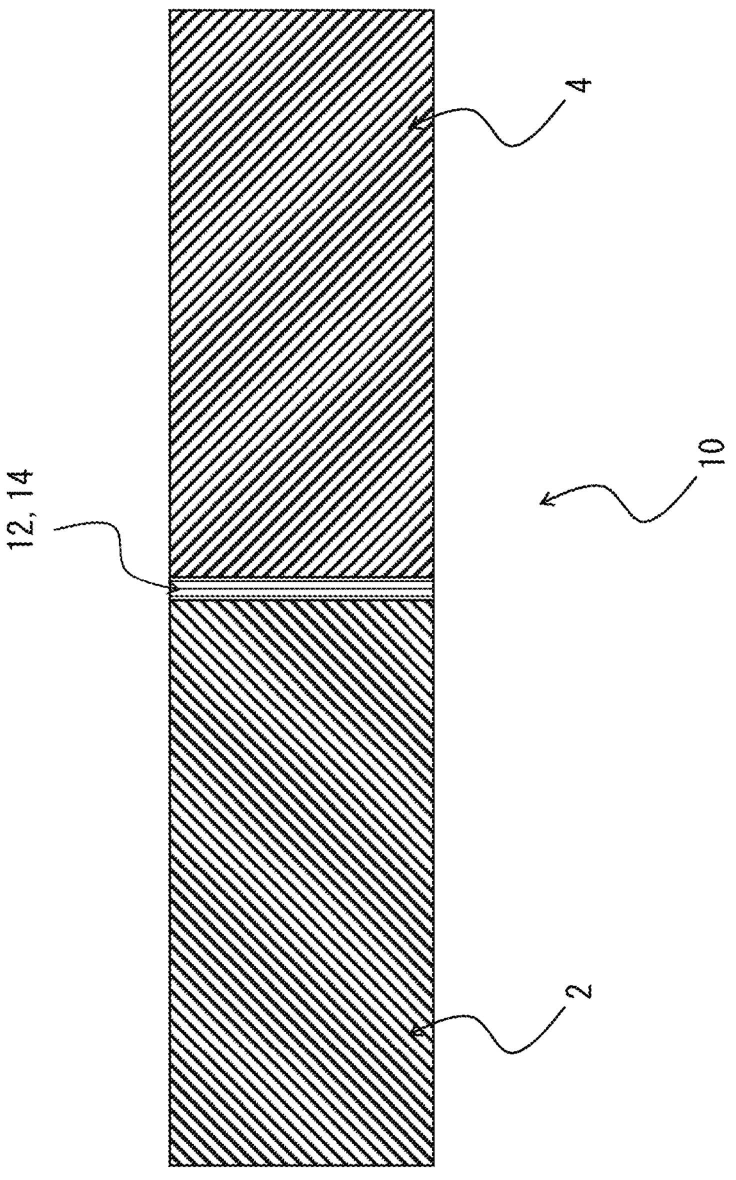
[FIG.5]

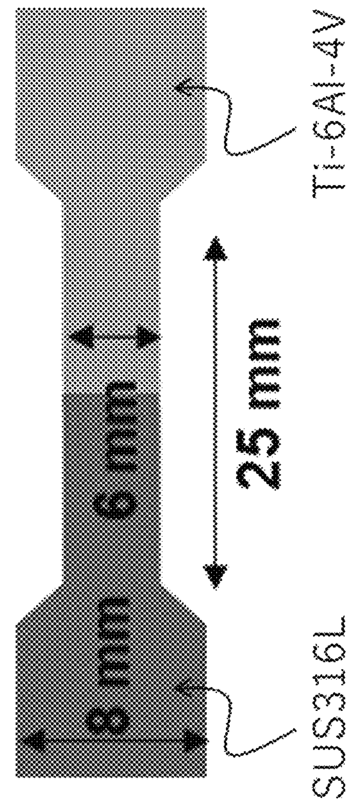
[FIG.6]

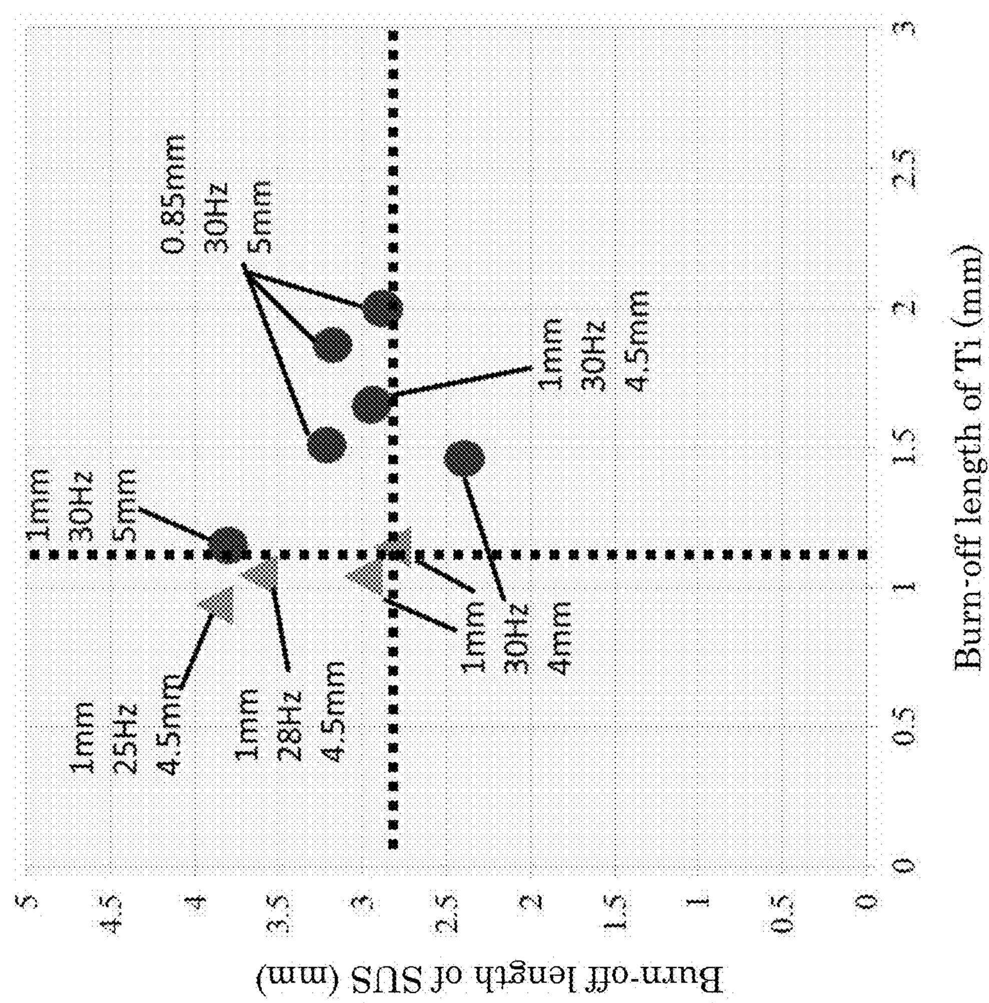
[FIG.7]

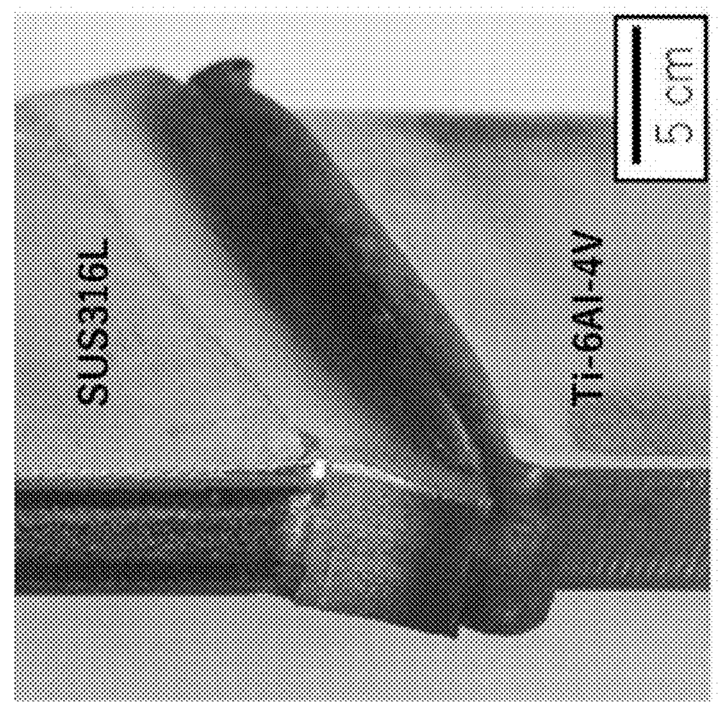
[FIG.8]

[FIG.9]
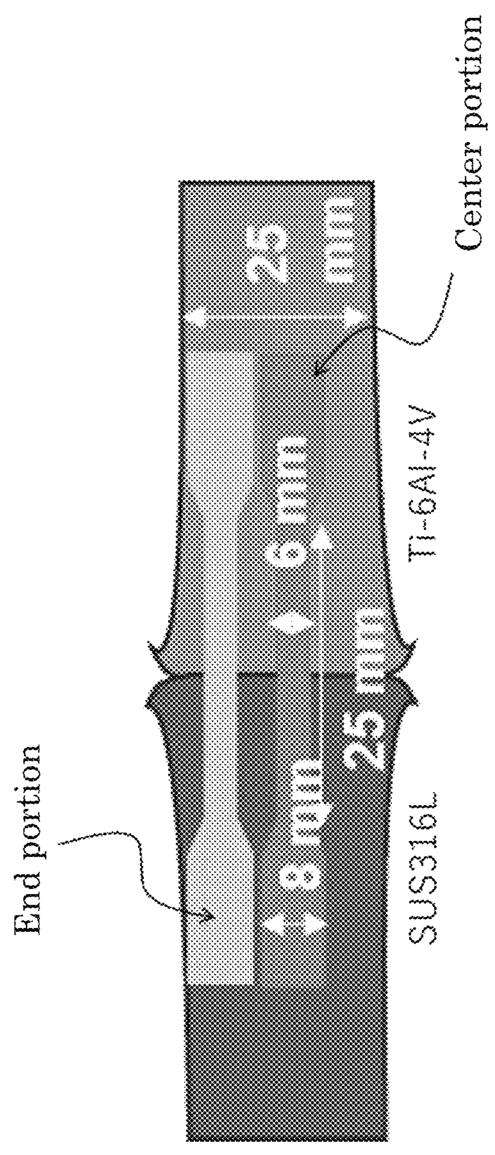

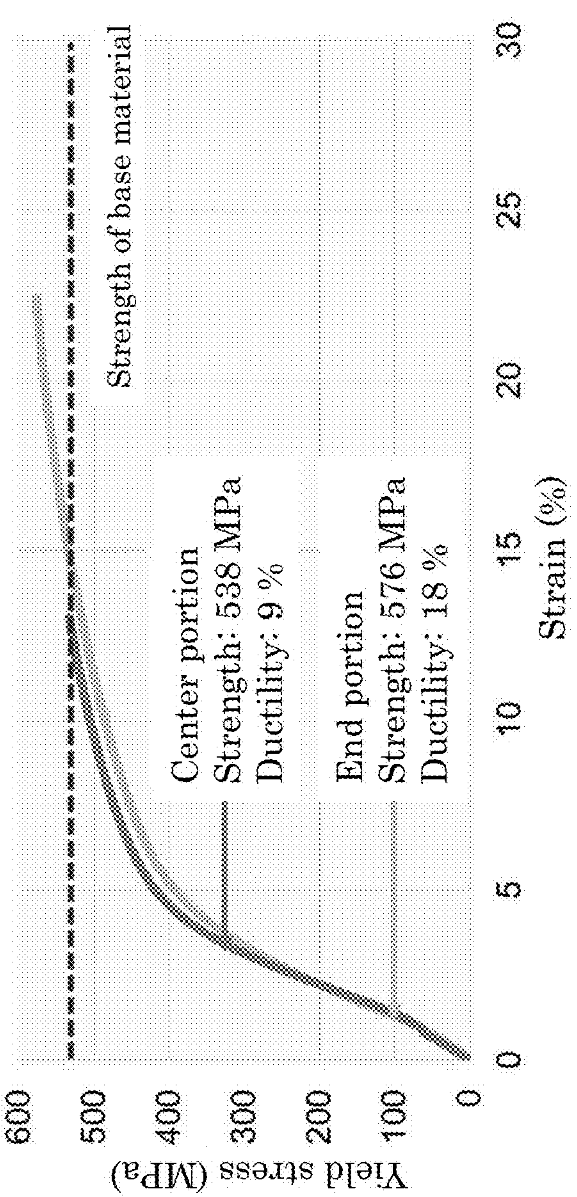
[FIG.10]

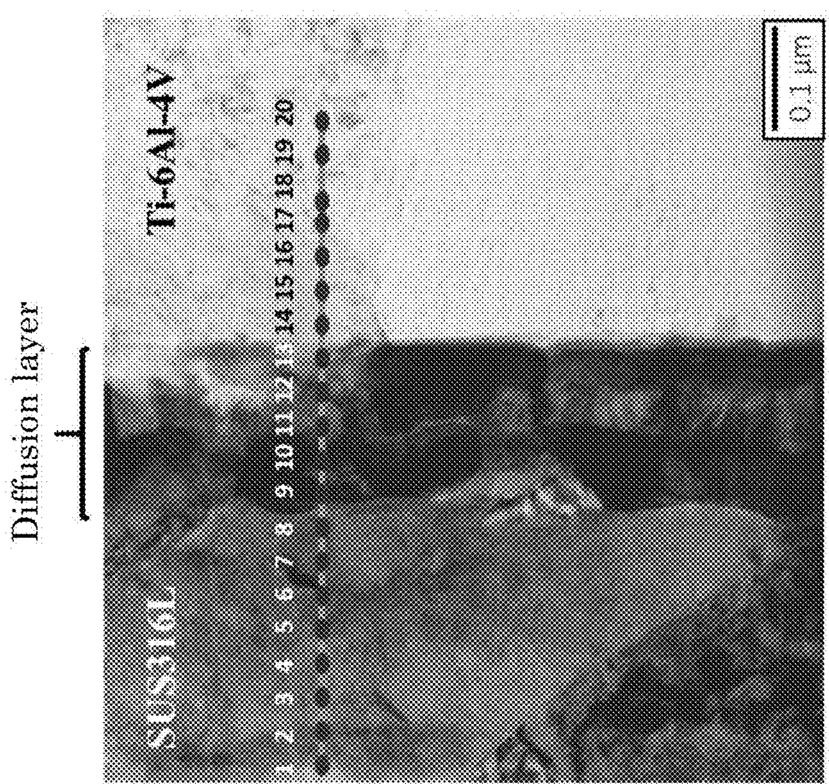
[FIG.11]

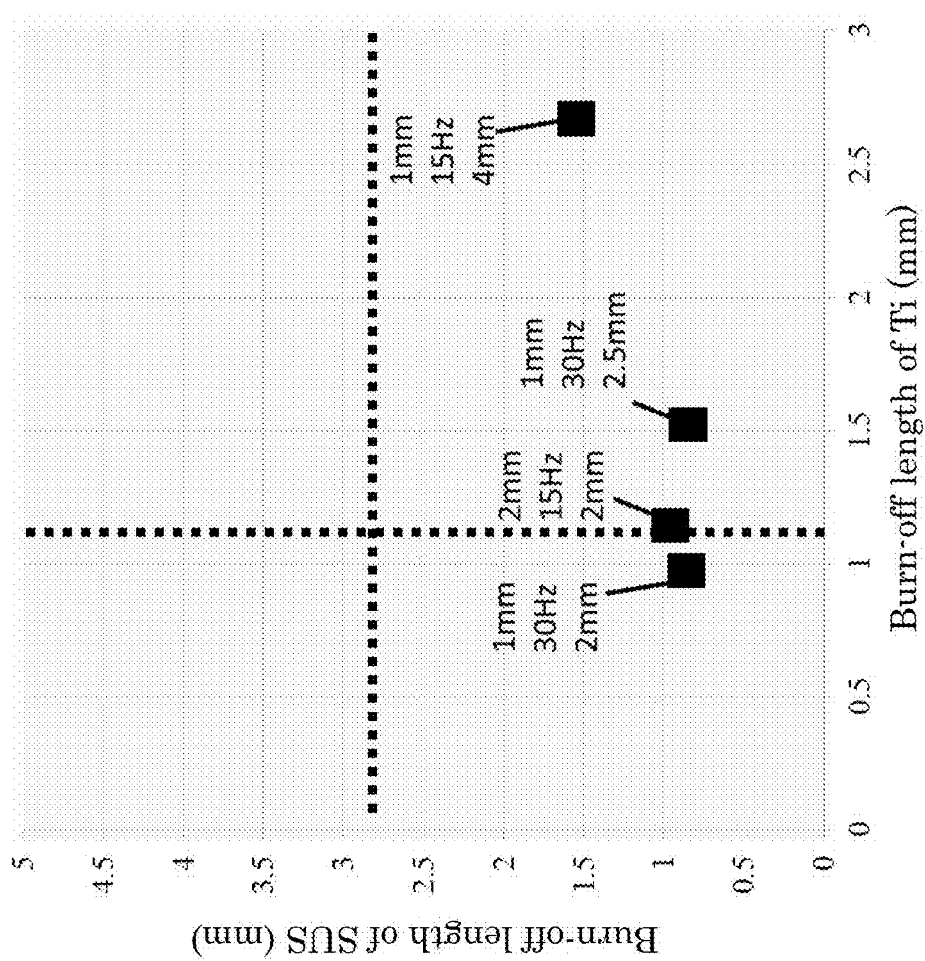
[FIG.12]

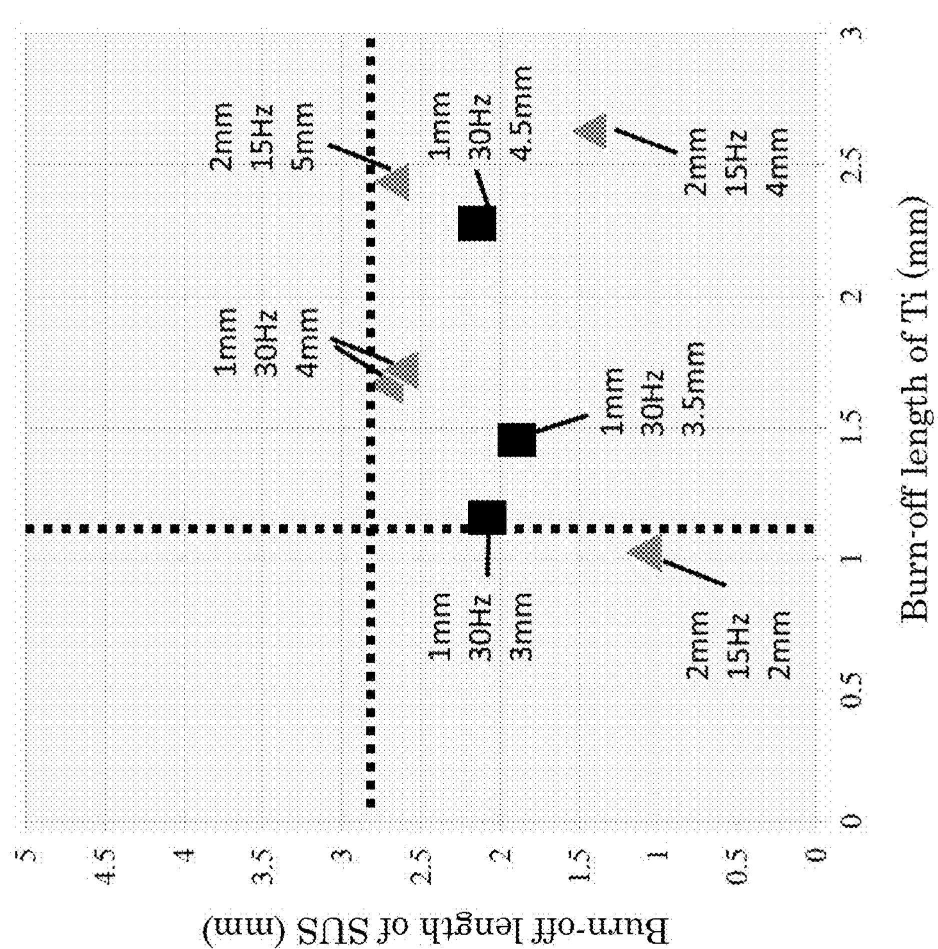
[FIG.13]

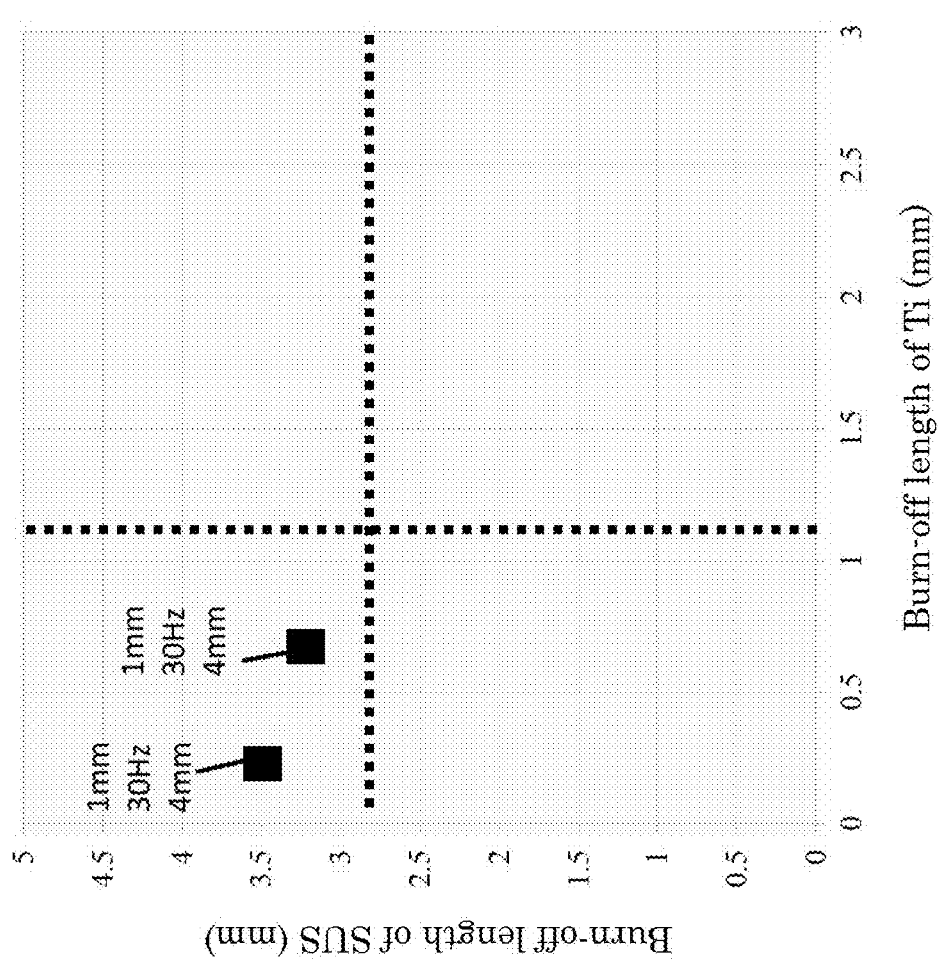
[FIG.14]

DISSIMILAR MATERIAL SOLID PHASE BONDING METHOD, AND DISSIMILAR MATERIAL SOLID PHASE BONDED STRUCTURE

TECHNICAL FIELD

The present invention relates to a dissimilar material solid phase bonding method for solid phase bonding between metal materials and a dissimilar material solid phase bonding structure obtained by the dissimilar material solid phase bonding method.

BACKGROUND ART

With the increase in strength of metal materials such as steel and aluminum alloys, the decrease in strength at the bonded portion that determine the mechanical properties of the bonding structure has become a serious problem. On the other hand, in recent years, attention has been paid to a solid phase bonding method in which the maximum temperature reached during bonding does not reach the melting point of the material to be bonded and the decrease in strength at the bonded portion is smaller than that of conventional melt welding, and it is rapidly progressing to put into practical use.

In particular, "friction welding" in which a rotating columnar material to be bonded is pressed against a fixed material to be bonded and "linear friction welding" in which the material to be bonded is reciprocated in contact with the other material to be bonded are used. Since it does not require a tool for press-fitting into the material to be bonded unlike friction stir welding, it can be easily applied to high melting point and high strength metals such as steel and titanium.

In addition, the present inventors have proposed a bonding method capable of accurately controlling the bonding temperature by the applied pressure at the time of bonding, and have succeeded in significantly lowering the bonding temperature. For example, Patent Document 1 (International Publication No. 2017/022184) discloses a friction welding method where surfaces to be bonded of two metal members to be bonded are made slide in contact with each other, wherein; at least one of the metal members to be bonded is a ferrous material, and a maximum temperature reached during bonding is equal to or less than the $A_3$ point or equal to or less than the $A_{cm}$ point of the ferrous material.

The conventional frictional bonding is a bonding method using frictional heat, but in the frictional bonding method described in Patent Document 1, by positively utilizing the processing heat generated by the plastic deformation of the metal materials to be bonded, a good bonding can be obtained even at a low bonding temperature.

Further, Patent Document 2 (Japanese Unexamined Patent Publication No. 2018-122344) discloses a linear friction welding method, comprising: a first step of forming the interface to be welded by bringing one member into contact with the other member, a second step of repeatedly sliding the one member and the other member on the same locus while applying a pressure substantially perpendicular to the interface to be welded, and discharging flash from the interface to be welded, a third step of forming a welding surface by stopping the sliding, wherein; setting the pressure to be greater than or equal to the yield stress and less than or equal to the tensile strength of the one member and/or the other member at the desired welding temperature.

In the linear friction welding method described in Patent Document 2, the relationship between the yield strength and the temperature is substantially constant depending on the material, and the temperature can be controlled extremely accurately by the applied pressure for discharging burrs from the interface to be bonded.

PRIOR ART REFERENCE

Patent Reference

Patent Reference 1: WO2017/022184
Patent Reference 2: JP 2018-122344A

SUMMARY OF THE INVENTION

Problem to be Solved by the Invention

However, an appropriate bonding method has not been established for dissimilar material bonding, which often forms fragile intermetallic compounds at the bonding interface in addition to different physical properties, and the merits of the sold phase bonding method that can control and lower the bonding temperature have not been fully enjoyed. Further, even when an intermetallic compound is not formed at the bonding interface, if the deformation behavior in the vicinity of the interface to be bonded is different during solid phase bonding, for example, when steel materials having different compositions are bonded, it is difficult to obtain a good joint by solid phase bonding.

In view of the above problems in the prior art, an object of the present invention is to provide a dissimilar solid phase bonding capable of efficiently forming a strong bonded portion of metal materials having different compositions. Another object of the present invention is to provide a dissimilar solid phase bonding structure having a dissimilar solid phase bonded portion in which metal materials having different compositions are firmly bonded.

Means to Solve the Problems

In order to achieve the above object, the present inventor has done intensive study as to deformation behavior of the interface to be bonded in the vicinity of the interface to be bonded during solid phase bonding of dissimilar materials, and have found that it is extremely important to control the bonding temperature by setting the bonding pressure to deform the materials to be bonded having different compositions together, and have reached the present invention.

Namely, the present invention can provide a dissimilar material solid phase bonding method where one member is brought into contact with another member to form an interface to be bonded, and newly formed surfaces of the one member and the other member are formed at the interface to be bonded, by means of the application of a bonding load, characterized in that:

the one member and the other member have different compositions;

the temperature at which the one member and the other member have substantially the same strength is defined as a bonding temperature; and the bonding load at which strength is applied substantially perpendicular to the interface to be bonded is set.

The dissimilar material solid phase bonding method of the present invention is a method of bonding members having different compositions, and it is important that the one member and the other member have "temperatures having substantially the same strength". Although the strength of the metal material depends on the temperature, both members are deformed at the interface to be bonded by subjecting to solid phase bonding at a temperature at which the strength of the one member and the strength of the other member (for example, tensile strength) are substantially the same, to form new surfaces on the surface to be bonded of both members, and a good bonding can be obtained by contacting the new surfaces with each other. Here, substantially the same strength does not mean that the strengths are completely the same, and it may be a strength range in which the formation of the new surfaces at the interface to be bonded proceeds to the same extent. Further, when the shape and/or size of the one member and the other member are different, since the heat conduction is different, the deformation behaviors in the vicinity of the interface to be bonded are different (for example, it is expected that the temperature of the larger member will drop slightly). Therefore, a difference of about several tens of MPa is allowed for "substantially the same strength".

Here, the method for raising the temperature in the vicinity of the interface to be bonded is not particularly limited as long as the effect of the present invention is not impaired, and various conventionally known bonding methods can be used. For example, in addition to "friction welding" in which a rotating columnar material is pressed against a fixed material to be bonded, and "linear friction welding" in which the materials to be bonded are reciprocated in contact with each other, resistance heating, high frequency heating, laser heating, flame heating and the like may be used.

In the solid phase bonding of dissimilar materials of the present invention, it is necessary to accurately control the bonding temperature, and the object can be achieved by appropriately setting the bonding load applied substantially perpendicular to the interface to be bonded. For example, in the case of linear friction welding, the frictional heat increases when the applied pressure of the linear friction welding is increased, but since the softened material becomes burrs and is continuously discharged, the "bonding temperature" is determined by the pressure (force to discharge burrs) which is applied to the softened material. That is, when the applied pressure is set high, the material to be bonded with higher strength (state with high yield strength) can be discharged as burrs. Here, since the "state with higher yield strength" means the "state with lower temperature", the "bonding temperature" decreases as the applied pressure increases. Since the relationship between the yield strength and the temperature is substantially constant depending on the material, the bonding temperature can be controlled extremely accurately.

That is, the bonding temperature can be controlled by setting the pressure at the time of solid phase bonding to be equal to or higher than the yield stress of the one member and/or the other member and equal to or lower than the tensile strength at a desired bonding temperature. Here, when the pressure at the time of solid phase bonding is set to be equal to or higher than the yield stress of the material to be bonded, the discharge of burrs from the interface to be bonded is started, and when the pressure is increased up to the tensile strength, the discharge of burrs is accelerated. Similar to the yield stress, since the tensile strength at a specific temperature is substantially constant depending on the material to be bonded, the bonding temperature corresponding to the set pressure can be realized.

Though the pressure applied during bonding may be optionally finely adjusted according to the size and shape of the material to be bonded from the viewpoint of the actually obtained bonding temperature, it is preferable to set the yield stress of the one member and/or the other member at the desired bonding temperature. In solid phase bonding, the discharge of burrs starts at the moment when the pressure reaches the yield stress, the desired bonding temperature can be realized more accurately in comparison with the case when the pressure is set to a higher value (up to the tensile strength).

In the solid phase bonding of dissimilar materials of the present invention, the one member and the other member having different compositions are bonded, and, for example, it can be applied not only the case that the main elements are different such as a steel member and a titanium alloy member, but also the case of combination in which the main element is the same but the additive element is different such as a steel members having different compositions.

Further, in the solid phase bonding of dissimilar materials of the present invention, it is preferable to raise the temperature of the interface to be bonded by the frictional heat generated by the sliding of the one member and the other member. By raising the temperature of the interface to be bonded by the frictional heat generated by the sliding of the one member and the other member, it is not necessary to provide other external heating mechanism or the like. In addition, by sliding, the oxide film and the like can be effectively removed from the interface to be bonded, and the new surfaces can be efficiently bonded to each other.

Further, in the solid phase bonding of dissimilar materials of the present invention, it is preferable to raise the temperature of the interface to be bonded by using resistance heating.

When resistance heating is used, it is difficult to remove the oxide film or the like from the interface to be bonded only by the heating step, as in the case of using sliding between the materials to be bonded. On the other hand, in the case of friction welding, there may be a temperature difference between the central part and the outer peripheral part of the material to be bonded, but in the case of resistance heating, it is relatively easy to maintain the temperature distribution at the interface to be bonded constant depending on the resistance conditions and the like.

Further, in the solid phase bonding of dissimilar materials of the present invention, it is preferable to set the burn-off length so that the new surfaces of the one member and the other member are formed in substantially the entire area of the interface to be bonded in the one member and/or the other member. In the solid phase bonding of dissimilar materials of the present invention, the joint is obtained by abutting the new surfaces of the materials to be bonded, and in the one member and/or the other member, by forming the new surfaces in substantially the entire area of the interface to be bonded, a good joint is formed. Here, more preferably, it is desirable that the new surface is formed over the entire interface to be bonded in both the one member and the other member. By bringing the new surfaces of the one member and the other member into contact with each other, it is possible to obtain a strong bonded portion using all the new surfaces generated during the bonding. Here, it is most preferable to stop the increase in the burn-off length at the timing when the new surface is formed over the entire interface to be bonded in both members. By stopping the increase in the burn-off length at this timing, it is possible to obtain a good joint in which the entire area of the interface to be bonded is bonded by the contact between the new surfaces. Here, by making the total of the surface area of the discharged burrs and the increase area in the interface to be bonded increased due to the deformation of the material to be bonded approximately twice the area of the interface to be bonded before bonding, it is possible to form the new surface over the entire interface to be bonded.

Further, in the solid phase bonding of dissimilar materials of the present invention, when the bonding temperature does not exist in the one member and the other member, it is preferable to create the bonding temperature by subjecting the one member and/or the other member to external cooling and/or external heating. When there is no temperature at which the strengths of the one member and the other member are the same, it is not possible to impart the same degree of deformation and/or discharge of burrs to the one member and the other member in the vicinity of the interface to be bonded. On the other hand, by subjecting to the external cooling and/or external heating, it is possible to adjust the strength of the one member or the other member in the vicinity of the interface to be bonded, and it is possible to make the strengths of the one member and the other member substantially the same.

Further, in the solid phase bonding of dissimilar materials of the present invention, it is preferable that the one member and/or the other member is an iron-based metal member. Iron-based metal members such as steel are the most frequently used metal materials, and there is a great demand for bonding dissimilar materials. Further, since the iron-based metals have mechanical properties that can withstand the bonding process of various solid phase bonding, by using the iron-based metal as the material to be bonded, it is possible to prevent deformation at unnecessary points during the bonding process, and the like. In addition, the dissimilar material bonding method of the present invention is solid phase bonding, and it is possible to suppress the deterioration of the mechanical properties of the bonded portion, which is remarkably observed in general melt welding. In the present invention, the iron-based metal means a metal mainly composed of iron in the composition, and includes, for example, various steels, cast iron, and the like.

Further, in the solid phase bonding of dissimilar materials of the present invention, though the bonding temperature is basically determined by the combination of the one member and the other member, it is preferable to set the bonding temperature to an $A_1$ point or less of the iron-based metal used as the material to be bonded. In the iron-based metals, there is a case that brittle martensite is formed by phase transformation to make bonding difficult and to make the bonded portion brittle. On the other hand, when the bonding temperature is set to the $A_1$ point or less, since any phase transformation does not occur, the formation of brittle martensite can be completely suppressed.

Further, in the solid phase bonding of dissimilar materials of the present invention, by measuring the temperature in the vicinity of the interface to be bonded and the bonding load during bonding, and comparing the obtained measured temperature with the bonding temperature, it is preferable that when the measured temperature is higher than the bonding temperature, the bonding load is increased, and when the measured temperature is lower than the bonding temperature, the bonding load is decreased. By having the feedback mechanism, the bonding temperature can be controlled more accurately.

Further, the present invention provides a dissimilar material bonding structure characterized by:

having a solid phase bonded portion where the one member and the other member are integrated via a solid phase bonding interface, having different compositions in the one member and the other member, and having a thickness of an intermetallic compound layer of less than 500 nm over the entire solid phase bonding interface.

The dissimilar material bonding structure of the present invention has a dissimilar material bonded portion, and the thickness of the intermetallic compound layer is less than 500 nm in the entire solid phase bonding interface. As a result, the solid phase bonding interface has a high strength, and in a tensile test using a tensile test piece which is composed of the one member, the other member, and the solid phase bonded portion in a parallel portion, it is preferable to show substantially the same tensile strength as the one member or the other member. Here, the more preferable thickness of the intermetallic compound layer is less than 300 nm, and the most preferable thickness of the intermetallic compound is less than 100 nm.

Further, in the dissimilar material bonding structure of the present invention, it is preferable that the solid phase bonding interface contains recrystallized grains. Since the structure in the vicinity of the bonding interface becomes fine equiaxial recrystallized grains, it is possible to make the bonded portion having excellent mechanical properties such as strength, toughness, and reliability.

In the dissimilar material bonding structure of the present invention, it is preferable that the one member is an iron-based metal and the other member is an aluminum alloy, a titanium alloy or a nickel alloy. Though a brittle intermetallic compound layer is formed at the interface between the iron-based metal/aluminum alloy, the iron-based metal/titanium alloy, and the iron-based metal/nickel alloy, when the thickness of the intermetallic compound layer is less than 500 nm, it is possible to realize a dissimilar material bonding structure which exhibits substantially the same tensile strength as the base metal in the tensile test.

Further, in the dissimilar material bonding structure of the present invention, the bonded portion has good mechanical properties, even when there is no temperature at which the tensile strength or the yield strength of the one member and the other member are substantially the same.

Further, in the dissimilar material bonding structure of the present invention, it is preferable that the width (width of the interface to be bonded) of the one member and/or the other member is 10 mm or more. When the width of the material to be bonded becomes large, since it becomes difficult to control the bonding temperature at the interface to be bonded, it is not possible to form a homogeneous bonding interface by the conventional bonding method. On the other hand, in the dissimilar material bonding structure of the present invention, the thickness of the intermetallic compound layer is less than 500 nm in the entire solid phase bonding interface even when the width is 10 mm or more.

The dissimilar material bonding structure of the present invention can be suitably obtained by the dissimilar material solid phase bonding method of the present invention.

Effects of the Invention

According to the present invention, it is possible to provide the dissimilar material solid phase bonding with which a robust bonded portion of metal materials having different compositions can be formed efficiently. Further according to the present invention, it is also possible to provide the dissimilar material solid phase bonded structure having a dissimilar material solid phase bonded portion in which metal materials having different compositions have been bonded together robustly.

BRIEF DESCRIPTION OF THE DRAWINGS

FIG. 1 is a schematic diagram which shows the situation during the linear friction welding.

FIG. 2 is a schematic diagram which shows the bonding process of the linear friction welding.

FIG. 3 is a graph which shows the deformation stress (yield stress) of the carbon steel at each temperature.

FIG. 4 is a graph which shows the tensile strength of various metals at each temperature.

FIG. 5 is a schematic sectional view which shows one example of the dissimilar material bonding structure of the present invention.

FIG. 6 is a schematic diagram which shows the shape and size of the tensile test piece and the cutout position in the Example.

FIG. 7 is a graph which shows the relationship between the tensile strength and the burn-off length of the dissimilar material solid phase bonded joint obtained in the Example.

FIG. 8 is an appearance photograph of the typical dissimilar solid phase bonding joint obtained in the Example.

FIG. 9 is a schematic diagram which shows the cutout position of the tensile test piece in the dissimilar material solid phase bonding joint shown in FIG. 8.

FIG. 10 is the results of the tensile test as to the tensile test piece shown in FIG. 9.

FIG. 11 is a TEM photograph of the vicinity of the bonding interface of the dissimilar solid phase bonding joint shown in FIG. 8.

FIG. 12 is a graph which shows the relationship between the tensile strength and the burn-off length of the dissimilar material solid phase bonded joint obtained in the Comparative Example (applied pressure 200 MPa).

FIG. 13 is a graph which shows the relationship between the tensile strength and the burn-off length of the dissimilar material solid phase bonded joint obtained in the Comparative Example (applied pressure 300 MPa).

FIG. 14 is a graph which shows the relationship between the tensile strength and the burn-off length of the dissimilar material solid phase bonded joint obtained in the Comparative Example (applied pressure 500 MPa).

MODE FOR CARRYING OUT THE INVENTION

In the following, by referring the drawings, as the typical embodiments of the dissimilar material solid phase bonding method and the dissimilar material bonding structure of the present invention, the linear friction welding is explained as a typical case, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Dissimilar Material Solid Phase Bonding Method

FIG. 1 is a schematic diagram which shows the situation during the linear friction welding. The linear friction welding is a solid phase bonding in which the frictional heat generated when the materials to be bonded are rubbed against each other by linear motion is the main heat source. In the conventional linear friction welding, the material softened by the temperature rise is discharged as burrs from the interface to be bonded to remove the oxide film formed on the interface to be bonded, and the new surfaces are brought into contact with each other to obtain the bonded portion.

In linear friction welding, when the frictional heat is generated by sliding between the materials to be bonded, it is generally considered that the calorific value increases as the applied pressure increases and the bonding temperature rises.

However, as a result of intensive studies by the present inventors, it was found the phenomena that the temperature in vicinity of the bonding interface (so-called "bonding temperature") decreases as the applied pressure increases.

Specifically, as described above, the frictional heat increases when the applied pressure of the linear friction welding is increased, but since the softened material becomes burrs and is continuously discharged, the "bonding temperature" is determined by the pressure (force to discharge burrs) which is applied to the softened material. That is, when the applied pressure is set high, the material to be bonded with higher strength (state with high yield strength) can be discharged as burrs. Here, since the "state with higher yield strength" means the "state with lower temperature", the "bonding temperature" decreases as the applied pressure increases. Since the relationship between the yield strength and the temperature is substantially constant depending on the material, the bonding temperature can be controlled extremely accurately.

That is, in the present invention, the bonding temperature can be controlled by setting the pressure at the time of solid phase bonding to be equal to or higher than the yield stress of the one member and/or the other member and equal to or lower than the tensile strength at a desired bonding temperature. Here, when the pressure at the time of solid phase bonding is set to be equal to or higher than the yield stress of the material to be bonded, the discharge of burrs from the interface to be bonded is started, and when the pressure is increased up to the tensile strength, the discharge of burrs is accelerated. Similar to the yield stress, since the tensile strength at a specific temperature is substantially constant depending on the material to be bonded, the bonding temperature corresponding to the set pressure can be realized.

FIG. 2 is a schematic diagram which shows the bonding process of the linear friction welding. The linear friction welding method consists of a first step of bringing the one member 2 into contact with the other member 4 to form an interface 6 to be bonded, a second step of repeatedly sliding the one member 2 and the other member 4 on the same locus a state while applying a pressure substantially perpendicular to the interface 6 to be bonded to discharge the burr 8 from the interface to be bonded substantially parallel to and substantially perpendicular to the sliding direction, and a third step of forming a bonding surface by stopping the sliding. When the dissimilar solid phase bonding method of the present invention is achieved by using the linear friction welding, the one member 2 and the other member 4 having different compositions are used as materials to be bonded, and the temperature at which the strengths of the one member 2 and the other member 4 are substantially the same may be the bonding temperature. The bonding temperature can be accurately controlled by the bonding load applied substantially perpendicular to the interface to be bonded. Hereinafter, each step will be described in detail.

(1-1) First Step

The first step is a step of bringing the one member 2 into contact with the other member 4 to form an interface 6 to be bonded.

The one member 2 and/or the other member 4 is moved to a position where the formation of the bonded portion is desired, and the surfaces to be bonded are brought into contact with each other to form the interface 6 to be bonded.

The shape and size of the one member 2 and the other member 4 are not particularly limited as long as the effects of the present invention are not impaired, and may be anyone that the temperature in the vicinity of the interface to be bonded can be raised by sliding between the materials to be bonded, resistance heating, or the like.

Here, when the linear friction welding is used, it is preferable that the interface 6 to be bonded is square or rectangular. By making the interface 6 to be bonded square or rectangular, it is possible to determine the timing at which the bonding (sliding) is stopped by using the discharge status of the burr 8 as an index.

(1-2) Second Step

The second step is a step of repeatedly sliding the one member 2 and the other member 4 on the same locus a state while applying a pressure P substantially perpendicular to the interface 6 to be bonded to discharge the burr 8 from the interface 6 to be bonded substantially parallel to and substantially perpendicular to the sliding direction.

The method of repeatedly sliding the one member 2 and the other member 4 on the same locus is not particularly limited as long as the effect of the present invention is not impaired, and may be a method in which both members are vibrated together, or a method in which one is vibrated while the other is fixed.

Here, in the dissimilar material solid phase bonding method of the present invention, the pressure P at the time of the linear friction welding is set to the strength at a temperature at which the strengths of the one member 2 and the other member 4 are substantially the same. Here, the "strength" is preferably set to be equal to or higher than the yield stress to be equal to or lower than the tensile strength of the one member 2 and the other member 4, and more preferably set to the yield stress. When the pressure P is set to be equal to or higher than the yield stress of the material to be bonded, the discharge of burrs 8 from the interface 6 to be bonded is started, and when the pressure P is increased up to the tensile strength, the discharge of burrs 8 is accelerated. Similar to the yield stress, since the tensile strength at a specific temperature is substantially constant depending on the material to be bonded, the bonding temperature corresponding to the set pressure P can be realized.

As a result, in the dissimilar solid phase bonding method of the present invention, both members are deformed at the interface 6 to be bonded, and new surfaces are formed on the surfaces to be bonded of both members, so that the new surfaces come into contact with each other to obtain a good bonded portion. Here, since the temperature dependence of the strength is different between the one member 2 and the other member 4, though the deformation behavior and the burr discharge status in the vicinity of the interface 6 to be bonded are also different, it may be allowable if a new surface is formed at the interface 6 to be bonded due to the deformation and burr discharge.

As a specific example, FIG. 3 shows the deformation stress (yield stress) of the carbon steel at each temperature, and FIG. 4 shows the tensile strength of various metals at each temperature. FIG. 3 is a graph published in "Iron and Steel, No. 11, the 67$^{th}$ year (1981), p. 140", and FIG. 4 is "Iron and Steel, No. 6, the 72$^{th}$ year (1986), p. 55". It is a graph published in "Page". As shown in these figures, the tensile strength and yield stress at a specific temperature are substantially constant depending on the material.

That is, when the pressure P at the time of bonding is set high, the material to be bonded having higher yield strength and tensile strength can be discharged as burrs, and the bonding temperature can be lowered. Further, as shown in FIG. 3 and FIG. 4, since the tensile strength and the yield stress at a specific temperature are substantially constant depending on the material, the bonding temperature can be controlled extremely accurately.

Further, in order to control the bonding temperature more accurately, it is preferable to set the pressure P to the yield stress of the one member and/or the other member at a desired bonding temperature. In solid phase bonding, the discharge of burrs 8 starts at the moment when the pressure P reaches the yield stress, the desired bonding temperature can be realized more accurately in comparison with the case when the pressure P is set to a higher value (up to the tensile strength).

In other words, the yield stress of the material to be bonded decreases due to the temperature rise due to frictional heat, and the discharge of the burr 8 starts at the moment when the yield stress becomes lower than the pressure P. Here, though the rate of temperature rise increases by increasing the amplitude and frequency at which the material to be bonded is slid, the maximum temperature reached (bonding temperature) does not change.

In linear friction welding, it is necessary to set bonding parameters (frequency and amplitude for exciting the material to be bonded, bonding time, burn-off length, and the like) other than the pressure P, but these values are not limited as long as the effect of the present invention is not impaired, and may be appropriately set depending on the property, shape, size and the like of the material to be bonded. In the dissimilar solid phase bonding method of the present invention, the frequency and the amplitude affect the temperature rise rate, but do not affect the bonding temperature.

When the one member 2 and/or the other member 4 is made of the iron-based metal, it is preferable to set the bonding temperature to an $A_1$ point or less of the iron-based metal used as the material to be bonded. In the iron-based metals, there is a case that brittle martensite is formed by phase transformation to make bonding difficult and to make the bonded portion brittle. On the other hand, when the bonding temperature is set to the A1 point or less, since any phase transformation does not occur, the formation of brittle martensite can be completely suppressed.

When the one member 2 and/or the other member 4 is made of titanium or a titanium alloy, the bonding temperature is preferably set to be equal to or lower than the β transus temperature of titanium or the titanium alloy. By setting the bonding temperature to be equal to or lower than the β transus temperature of titanium or a titanium alloy, the structure of the bonded portion can be made into fine equiaxial grains, and a bonded portion having both high strength and toughness can be formed.

(1-3) Third Step

The third step is a step of stopping sliding in the second step to form a bonding surface. In the linear friction welding method, a good bonded body can be obtained by stopping the sliding after the burrs 8 are discharged from the entire surface of the interface 6 to be bonded. The pressure P applied to the material to be bonded in the second step may be maintained as it is, or may be set to a higher value for the purpose of discharging the burr 8 and making the new surface being brought into contact more strongly.

Here, though the timing at which the sliding is stopped is not limited as long as the burr 8 is discharged from the entire surface of the interface 6 to be bonded, in the one member 2 and/or the other member 4, it is preferable to set the burn-off length so that the new surface is formed in the entire area of the interface 6 to be bonded in the one member 2 and the other member 4, and is more preferable to form the new surfaces in the entire area of the interface 6 to be bonded in both the one member 2 and the other member 4. When the new surfaces of the one member 2 and the other member 4 come into contact with each other, a strong bonding can be obtained. Here, it is more preferable to stop the increase in the burn-off length (stop the sliding) at the timing when the new surface is formed over the entire interface 6 to be bonded in both members. By terminating the bonding process at this timing, it is possible to obtain a good bonding in which the entire area of the interface 6 to be bonded is bonded by abutting between the new surfaces most efficiently. By making the total of the surface area of the discharged burrs 8 and the increase area in the interface 6 to be bonded increased due to the deformation of the material to be bonded approximately twice the area of the interface 6 to be bonded before bonding, it is possible to form the new surface over the entire interface 6 to be bonded.

(2) Dissimilar Material Bonding Structure

FIG. 5 is a schematic sectional view which shows one example of the dissimilar material bonding structure of the present invention. The dissimilar material bonding structure 10 is one in which the one member 2 and the other member 4 having different compositions are solid-phase bonded.

The one member 2 and the other member 4 are metallurgically bonded via the solid phase bonding interface 12, and an intermetallic compound layer 14 having a thickness of less than 500 nm is formed over the entire solid phase bonding interface 12. Here, the intermetallic compound layer 14 does not necessarily have to be observed, and when it is not clearly observed, it indicates that the thickness is less than 500 nm. Further, the more preferable thickness of the intermetallic compound layer 14 is less than 300 nm, and the most preferable thickness of the intermetallic compound layer 14 is less than 100 nm.

It is preferable that the solid phase bonding interface 12 contains recrystallized grains. Since the structure in the vicinity of the bonding interface becomes fine equiaxial recrystallized grains, it is possible to make the bonded portion having excellent mechanical properties such as strength, toughness, and reliability.

Further, it is preferable that the one member 2 is an iron-based metal and the other member 4 is an aluminum alloy or a titanium alloy. Though a brittle intermetallic compound layer 14 is formed at the interface between the iron-based metal/aluminum alloy and the iron-based metal/titanium alloy, when the thickness of the intermetallic compound layer 14 is less than 500 nm in the entire solid phase bonding interface 12, it is possible to realize a dissimilar material bonding structure 10 which exhibits substantially the same tensile strength as the base metal in the tensile test.

Further, in the dissimilar material bonding structure 10, it is preferable that the width of the one member 2 and/or the other member 4 is 10 mm or more. When the width of the material to be bonded becomes large, since it becomes difficult to control the bonding temperature at the interface 6 to be bonded, it is not possible to form a homogeneous bonding interface by the conventional bonding method. On the other hand, in the dissimilar material bonding structure 10, the thickness of the intermetallic compound layer 14 is less than 500 nm in the entire solid phase bonding interface 12 even when the width is 10 mm or more. Here, the width of the one member 2 and/or the other member 4 is preferably 15 mm or more, and more preferably 20 mm or more.

In the dissimilar material bonding structure 10, the solid phase bonding interface 12 having good mechanical properties is formed, even when there is no temperature at which the tensile strength or yield strength of the one member 2 and the other member 4 are substantially the same.

Although the typical embodiments of the present invention have been described above, the present invention is not limited to these, and various design changes are possible, and all of these design changes are included in the technical scope of the present invention.

Example

Titanium alloy Ti-6Al-4V (ASTM F 136-13) and austenitic stainless steel SUS316L (JIS G4303) were used as test materials. The dimensions of the test material were 65 mmL×25 mmW×5 mmT, and the surface of the 25 mmW×5 mmT was subjected to the dissimilar material linear friction welding as the surface to be bonded.

The bonding conditions were a pressure to be applied of 400 MPa, an amplitude of 0.85 to 1 mm, a frequency of 25 to 30 Hz, and a burn-off length of 4 to 5 mm. Here, the 400 MPa used as the pressure to be applied was set as a value at which the bonding temperature was substantially the same as the tensile strength of the titanium alloy Ti-6Al-4V and the austenitic stainless steel SUS316L.

A tensile test piece shown in FIG. 6 was cut out from the obtained dissimilar solid phase bonding joint and subjected to a tensile test. The size of the parallel portion of the tensile test piece is a plate thickness of 5 mm, a width of 6 mm, and a length of 25 mm. FIG. 7 shows the relationship between the obtained tensile strength and the burn-off length of each material to be bonded (the total of the burn-off length of the titanium alloy Ti-6Al-4V and the austenitic stainless steel SUS316L). When the tensile strength is 500 MPa or more, it is plotted as ○, and when being 200 to 500 MPa, it is plotted as Δ, and the bonding conditions are described in the vicinity of each plot. The bonding conditions are amplitude, frequency, and burn-off length from the top.

As shown in FIG. 7, when the pressure to be applied is 400 MPa, the tensile strengths of all the dissimilar solid phase joints are 200 MPa or more, and in the case that the new surface is sufficiently formed on the surface to be bonded of the titanium alloy Ti-6Al-4V and the austenitic stainless steel SUS316L (upper right in the figure), the tensile strength is 500 MPa or more. It should be noted that the dotted line in the figure indicates, in relation to each material to be bonded, the burn-off length where substantially the entire surface of the interface to be bonded becomes a new surface. That is, by realizing a burn-off length that is equal to or greater than the dotted line, a strong joint in which the new surfaces are brought into contact with each other can be reliably obtained. The value of the dotted line is different in the titanium alloy Ti-6Al-4V and the austenitic stainless steel SUS316L, because the amount of deformation and the amount of burrs discharged and the shape in the vicinity of the interface to be bonded are different.

FIG. 8 shows an external photograph of a typical dissimilar solid phase joint. It can be seen that the titanium alloy Ti-6Al-4V and the austenitic stainless steel SUS316L are both deformed in the vicinity of the interface to be bonded, and the new surfaces of the materials to be bonded are in contact with each other to achieve the bonding. Further, the area of the interface to be bonded, which was 125 $mm^2$ before bonding, was 267 $mm^2$ for the titanium alloy Ti-6Al-4V and 248 $mm^2$ for the austenitic stainless steel SUS316L, due to the state of the deformation and the state of the discharge of burrs of the material to be bonded, and both have about twice the area. The twice increase of the surface area indicates that a new surface was formed in all areas of the bonded surface before bonding, and the new surface of the titanium alloy Ti-6Al-4V and the new surface of the austenitic stainless steel SUS316L were brought into contact with each other to formed a robust bonding interface.

Here, in the titanium alloy Ti-6Al-4V, relatively thin burrs are discharged, and in the austenitic stainless steel SUS316L, it is deformed in a wide range in the longitudinal direction and has a shape in which the vicinity of the bonding interface is thickened. This is caused of the difference in temperature dependence of the strength and the thermal conductivity of the material to be bonded, but considering the area of the new surface formed by the discharge of burrs and/or the deformation in the vicinity of the interface to be bonded, the burn-off length of each material to be bonded may be set so that the new surfaces are brought into contact with each other.

With respect to the dissimilar solid phase bonding joint shown in FIG. 8, a tensile test piece was cut out from the region shown in FIG. 9, and the tensile properties of the central portion and the end portion were measured. The obtained results are shown in FIG. 10. In the figure, the broken line shows the tensile strength of the austenitic stainless steel SUS316L, and it was confirmed that the strength of the bonded portion is equivalent to that of the base metal at both the central portion and the end portion. This indicates that the robust bonding between the new surfaces is achieved over the entire interface to be bonded.

FIG. 11 shows a TEM photograph of the interface of the dissimilar solid phase bonding joint shown in FIG. 8. In FIG. 11, no clear intermetallic compound layer is confirmed, and it can be seen that an extremely good bonding interface is formed. Further, when the EDS point analysis was performed perpendicular to the bonded interface, the region having dark contrast at the bonded interface was a diffusion layer (the thickness of the diffusion layer is about 100 nm). The plots in the photograph show the measurement points (1 to 20) of the point analysis, and the ratio of the constituent elements at each measurement point is as shown in TABLE 1.

TABLE 1

| | Measurement point | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| O | 1.34 | 1.48 | 2.44 | 0.96 | 2.1 | 2.67 | 2.1 | 1.66 | 1.95 | 2.55 | 1.99 | 2.16 | 2.58 | 2.14 | 2.46 | 2.85 | 2.31 | 1.93 | 2.32 | 3.21 |
| Al | 0.05 | 0.03 | 0.08 | 0.15 | 0.07 | 0.15 | 0.21 | 0.23 | 0.26 | 0.5 | 0.92 | 1.52 | 2.64 | 4.19 | 4.75 | 4.85 | 4.98 | 5.62 | 5.72 | 5.81 |
| Ti | 0.89 | 1.71 | 0.53 | 0.4 | 0.5 | 0.94 | 4.48 | 6.77 | 13.65 | 28.7 | 35.7 | 46.53 | 49.81 | 66.45 | 72.22 | 70.28 | 71.55 | 72.21 | 72.82 | 72.51 |
| V | 0.17 | 0.14 | 0.14 | 0.19 | 0.14 | 0.22 | 0.44 | 0.55 | 0.69 | 0.65 | 0.48 | 0.85 | 1.44 | 2.49 | 2.71 | 3.16 | 3.2 | 3.35 | 2.92 | 3 |
| Cr | 18.51 | 18.23 | 17.9 | 18 | 18.01 | 17.93 | 22.98 | 24.19 | 20.67 | 10.85 | 5.87 | 3.27 | 2.87 | 2.52 | 2.52 | 2.58 | 2.48 | 2.27 | 2.26 | 1.9 |
| Fe | 66.76 | 66.12 | 66.73 | 67.85 | 66.79 | 65.99 | 60.61 | 58.62 | 54.86 | 49.84 | 46.53 | 36.56 | 31.42 | 16.42 | 11.3 | 12.32 | 11.51 | 11.04 | 10.46 | 10.01 |
| Ni | 9.3 | 9.13 | 9.18 | 9.66 | 9.31 | 8.95 | 5.03 | 3.67 | 3.54 | 4.03 | 6.88 | 7.28 | 7.36 | 3.86 | 2.24 | 2.08 | 2.32 | 2.1 | 2.09 | 2.04 |
| Mo | 2.93 | 3.16 | 3.01 | 2.79 | 3.08 | 3.15 | 4.14 | 4.3 | 4.38 | 2.88 | 1.64 | 1.84 | 1.87 | 1.94 | 1.81 | 1.88 | 1.65 | 1.48 | 1.42 | 1.53 |

Comparative Example

Dissimilar material solid phase bonding was performed in the same manner as in the Example except that the pressures to be applied during the bonding were changed to 200, 300, and 500 MPa.

The tensile properties of the dissimilar solid phase bonding joint were evaluated in the same manner as in the Example. FIGS. 12, 13 and 14, respectively, show the relationship between the tensile strength and the burn-off length of each material to be bonded when the pressure to be applied is 200, 300 and 500 MPa. When the tensile strength is 200 to 500 MPa or more, it is plotted as Δ, and when being 200 MPa or less, it is plotted as □, and the bonding conditions are described in the vicinity of each plot. The bonding conditions are amplitude, frequency, and burn-off length from the top.

As shown in FIGS. 12 to 14, when the pressure to be applied at which the bonding temperature does not become the "intersection point" is set, a new surface cannot be formed to the same extent at both the bonded interfaces of the titanium alloy Ti-6Al-4V and the austenitic stainless steel SUS316L, no joint with a tensile strength of 500 MPa or more could be obtained under any of the bonding conditions.

More specifically, at the pressure to be applied of 200 MPa (FIG. 12) and 300 MPa (FIG. 13) where the bonding temperature is higher than the intersection point, the burn-off length of the titanium alloy Ti-6Al-4V increases, and at the pressure to be applied of 500 MPa (FIG. 14) where the bonding temperature is lower than the intersection point, the burn-off length of the austenitic stainless steel SUS316L increases.

That is, under any of the bonding conditions, a new surface cannot be formed to the same extent at the bonded interfaces of the titanium alloy Ti-6Al-4V and the austenitic stainless steel SUS316L.

EXPLANATION OF SYMBOLS

2 . . . One member,
4 . . . Other member,
6 . . . Interface to be bonded,
8 . . . Burr,
10 . . . Dissimilar material bonding structure,
12 . . . Solid phase bonding interface,
14 . . . Intermetallic compound layer.

The invention claimed is:

1. A dissimilar material solid phase bonding method where one member is brought into contact with another member to form an interface to be bonded, and newly formed surfaces of the one member and the other member are formed at the interface to be bonded, by applying a bonding load, wherein:

the one member and the other member have different compositions;

a temperature at which the one member and the other member have substantially a same strength is defined as a bonding temperature; and the bonding load at which strength is applied substantially perpendicular to the interface to be bonded is set;

wherein the one member and the other member are bonded at the bonding temperature and the bonding load.

2. The dissimilar material solid phase bonding method according to claim 1, wherein a temperature of the interface to be bonded is raised by frictional heat generated by sliding of the one member and the other member.

3. The dissimilar material solid phase bonding method according to claim 1, wherein a temperature of the interface to be bonded is raised by using resistance heating.

4. The dissimilar material solid phase bonding method according to claim 1, wherein a burn-off length is set so that the the newly formed surfaces of the one member and the other member are formed in substantially an entire area of the interface to be bonded in the one member and/or the other member.

5. The dissimilar material solid phase bonding method according to claim 1, wherein, the bonding temperature is created by subjecting the one member and/or the other member to external cooling and/or external heating.

6. The dissimilar material solid phase bonding method according to claim 1, wherein the one member and/or the other member is an iron-based metal member.

7. The dissimilar material solid phase bonding method according to claim 1, wherein, by measuring a temperature in the vicinity of the interface to be bonded and the bonding load during bonding, and comparing the obtained measured temperature with the bonding temperature, when the measured temperature is higher than the bonding temperature, the bonding load is increased, and when the measured temperature is lower than the bonding temperature, the bonding load is decreased.

* * * * *